Patented July 17, 1928.

1,677,554

UNITED STATES PATENT OFFICE.

ALPHONSE GAMS AND PAUL SCHEIDEGGER, OF BASEL, SWITZERLAND, ASSIGNORS TO THE FIRM SOCIETY OF CHEMICAL INDUSTRY IN BASLE, OF BASEL, SWITZERLAND.

COMPOUND OF GALL ACIDS AND PROCESS OF MAKING SAME.

No Drawing. Application filed July 31, 1926, Serial No. 126,335, and in Switzerland September 2, 1925.

The present invention relates to the manufacture of compounds of gall acids. It comprises the process of manufacture thereof as well as the new products themselves.

Recent researches have shown that the formation of concretions in the gall is to be ascribed to a deficiency of protective colloids which are able to keep in colloidal solution the cholesterin and other constituents of the gall, for instance the calcium bilirubinate.

Based upon these researches attempts have been made to supply the said deficiency by ingestion of protective colloids, such as lecithin or compounds thereof, with gall acids.

According to the present invention new compounds are obtained with aid of which the described object can be attained in an advantageous manner, by causing the acids of the gall to react with acylated diamines instead of with lecithin, asymmetrically acylated diamines being preferably used.

The asymmetrically acylated diamines not only have an essentially stronger emulsifying capacity than lecithin has, but also have an additional therapeutic action which is highly desirable for the purpose in question and is not to be found in lecithin. That is to say they have on the one hand a very strong effect in inducing the flow of gall, which effect is equal to that of the most active gall acids, and on the other hand a pronounced antiseptic action.

The asymmetrically acylated diamines give well characterized compounds with the gall acids.

By the term "gall acids" the high molecular carboxylic acids contained in the gall, or their products of partial anhydrization, oxidation, etc., are understood. The empirical formula of the more important gall acids is the following:—

Cholic acid _____ $C_{23}H_{39}O_3.COOH$
Desoxycholic acid_____ $C_{23}H_{39}O_2.COOH$
Dehydrocholic acid_____ $C_{23}H_{33}O_3.COOH$
Apocholic acid_____ $C_{23}H_{37}O_2.COOH$ The reaction between the gall acid and the acylated diamine occurs according to the laws of the salt formation. Thus for instance, the formation of the dehydrocholate of oleyl-diethylethylene-diamine may be illustrated by the equation:

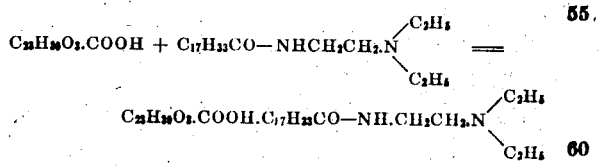

The compounds in question may be obtained by supply bringing together the acylated diamine and the gall acid, it may be in presence or absence of a solvent; for instance a solution of the components may be evaporated or the components may be triturated together or fused together, or analogously treated.

The new compounds are generally crystalline bodies which dissolve easily in methyl alcohol, ethyl alcohol, chloroform or acetone; partly they are dissolved with somewhat greater difficulty in ether.

They are applicable in disorders of the gall.

The following examples illustrate the invention:—

*Example 1.—Dehydrocholate of oleyldiethylethylenediamine.*

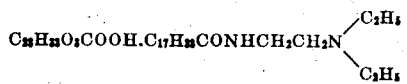

Molecular proportions of dehydrocholic acid and oleyldiethylethylenediamine are dissolved in a little alcohol, methyl alcohol or chloroform and the solvent is distilled or evaporated. There remains a yellowish mass, which consists of small flat waxy prisms. The compound becomes brown at 150° C. and is fully molten at 200° C. The same compound can also be obtained by intimately triturating together the components and allowing the mass, which is at first pasty, to remain until it has hardened.

*Example 2.—Cholate of isovaleryl-diethylethylenediamine.*

This compound, obtained from cholic acid and isovaleryl-diethylethylenediamine in the manner described in Example 1, is a white crystalline powder which sinters at 65° C. and melts at 90° C.

Example 3.—Cholate of benzoyldiethylethylenediamine.

An alcoholic solution of molecular proportions of cholic acid and benzoyldiethylethylenediamine is gradually evaporated. The compound produced is a white crystalline powder which softens above 70° C. and is molten at 99° C.

Example 4.—Cholate of stearyldiethylethylenediamine.

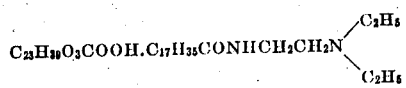

This compound is obtained in the manner described in Example 3 from molecular proportions of cholic acid and stearyldiethylethylenediamine. It forms colourless, fine needles, melting at 67° C.

Example 5.—Desoxycholate of stearyldiethylethylenediamine.

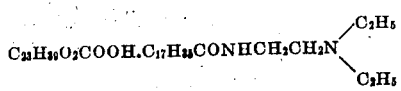

The compound obtained from molecular proportions of desoxycholic acid and stearyldiethylethylenediamine in the manner described in Example 1 forms small colourless, soft flat prisms which melt at 58° C.

Example 6.—Apocholate of stearyldiethylethylenediamine.

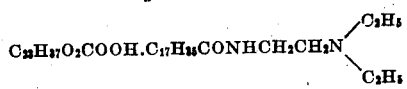

When an alcoholic solution of molecular proportions of apocholic acid and stearyldiethylethylenediamine is evaporated there remains a white, soft crystalline mass consisting of flat prisms, which melt but not sharply at about 132° C.

Example 7.—Dehydrocholic acid of diethylaminoethylcarbamic acid-menthylester.

Molecular proportions of dehydrocholic acid and diethylaminoethylcarbamic acid-menthylester are dissolved in methyl alcohol and the solution evaporated. The compound is a hard crystalline mass which begins to soften at 188° C. and is clearly molten at 199° C.

Example 8.—Dehydrocholate of stearylethylenediamine.

This compound is obtained from molecular proportions of dehydrocholic acid and stearylethylenediamine in the manner decribed in Example 7. It is a crystalline mass which sinters at 110° C. and is clearly molten at about 133° C.

What we claim is:—

1. Process for the manufacture of compounds of gall acids by causing an acylated aliphatic diamine to react with a gall acid.
2. Process for the manufacture of compounds of gall acids by causing an acylated aliphatic diamine to react with a gall acid in presence of a solvent.
3. Process for the manufacture of compounds of gall acids by causing an asymmetrically acylated aliphatic diamine to react with a gall acid.
4. Process for the manufacture of compounds of gall acids by causing an asymmetrically acylated aliphatic diamine to react with a gall acid in presence of a solvent.
5. Process for the manufacture of compounds of gall acids by causing an asymmetrically acylated aliphatic diamine to react with dehydrocholic acid.
6. Process for the manufacture of compounds of gall acids by causing an asymmetrically acylated aliphatic diamine to react with dehydrocholic acid in presence of a solvent.
7. Process for the manufacture of compounds of gall acids by causing oleyldiethylethylenediamine to react with a gall acid.
8. Process for the manufacture of compounds of gall acids by causing oleyldiethylethylenediamine to react with a gall acid in presence of a solvent.
9. Process for the manufacture of dehydrocholate of oleyldiethylethylenediamine by causing oleyldiethylethylenediamine to react with dehydrocholic acid.
10. Process for the manufacture of dehydrocholate of oleyldiethylethylenediamine by causing oleyldiethylethylenediamine to react with dehydrocholic acid in presence of a solvent.
11. As new products the compounds of acylated diamines with gall acids being well characterized generally crystalline bodies, which dissolve easily in methylalcohol, ethylalcohol, chloroform or acetone.
12. As new products the compounds of asymmetrically acylated diamines with gall acids being well characterized generally crystalline bodies, which dissolve easily in methylalcohol, ethylalcohol, chloroform or acetone.

13. As new products the compounds of asymmetrically acylated diamines with dehydrocholic acid being well characterized generally crystalline bodies, which dissolve easily in methylalcohol, ethylalcohol, chloroform or acetone.

14. As new products the compounds of oleyldiethylethylenediamine with gall acids being well characterized generally crystalline bodies, which dissolve easily in methylalcohol, ethylalcohol, chloroform or acetone.

15. As a new compound the cholate of oleyldiethylethylenediamine constituting a crystalline mass easily soluble in methylalcohol, ethylalcohol, chlorofrom and acetone becoming brown at 150° C. and being fully molten at 200° C.

In witness whereof we have hereunto signed our names this 16th day of July, 1926.

ALPHONSE GAMS.
PAUL SCHEIDEGGER.